(12) United States Patent
Usuda

(10) Patent No.: US 8,194,150 B2
(45) Date of Patent: Jun. 5, 2012

(54) MOVING IMAGE PROCESSING APPARATUS AND VIDEO CAMERA APPARATUS USING THE SAME

(75) Inventor: Tomoyuki Usuda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 442 days.

(21) Appl. No.: 12/576,451

(22) Filed: Oct. 9, 2009

(65) Prior Publication Data

US 2010/0091129 A1 Apr. 15, 2010

(30) Foreign Application Priority Data

Oct. 15, 2008 (JP) ................................. 2008-266157
Jun. 1, 2009 (JP) ................................. 2009-132049

(51) Int. Cl.
*H04N 5/228* (2006.01)
(52) U.S. Cl. ................... 348/222.1; 348/230.1; 348/374
(58) Field of Classification Search ............... 348/222.1, 348/230.1, 320, 322, 374
See application file for complete search history.

(56) References Cited

U.S. PATENT DOCUMENTS

| 2007/0173692 A1* | 7/2007 | Homan et al. | 600/118 |
| 2010/0079622 A1* | 4/2010 | Kasahara et al. | 348/231.99 |

FOREIGN PATENT DOCUMENTS

| JP | 2005-51296 A | 2/2005 |
| JP | 2008-54221 A | 3/2008 |

* cited by examiner

*Primary Examiner* — Gevell Selby
(74) *Attorney, Agent, or Firm* — Dickstein Shapiro LLP

(57) ABSTRACT

A moving image processing apparatus, includes a low-speed clock generation source to generate a low-speed clock signal of a first frequency, a high-speed clock generation source to generate a high-speed clock signal of a second frequency which is higher than the first frequency, an image data source to output progressive-type image data, a PI converter to convert the progressive-type image data output from the image data source into interlaced-type image data forming a field and to output the interlaced-type image data, and an arithmetic part to process the interlaced-type image output from the PI converter by use of only one of a pair of fields each formed by the interlaced-type image output from the PI converter. The high-speed clock generation source supplies the high-speed clock signal to the image data source and the PI converter, and the low-speed clock generation source supplies the low-speed clock signal to the arithmetic part.

9 Claims, 7 Drawing Sheets

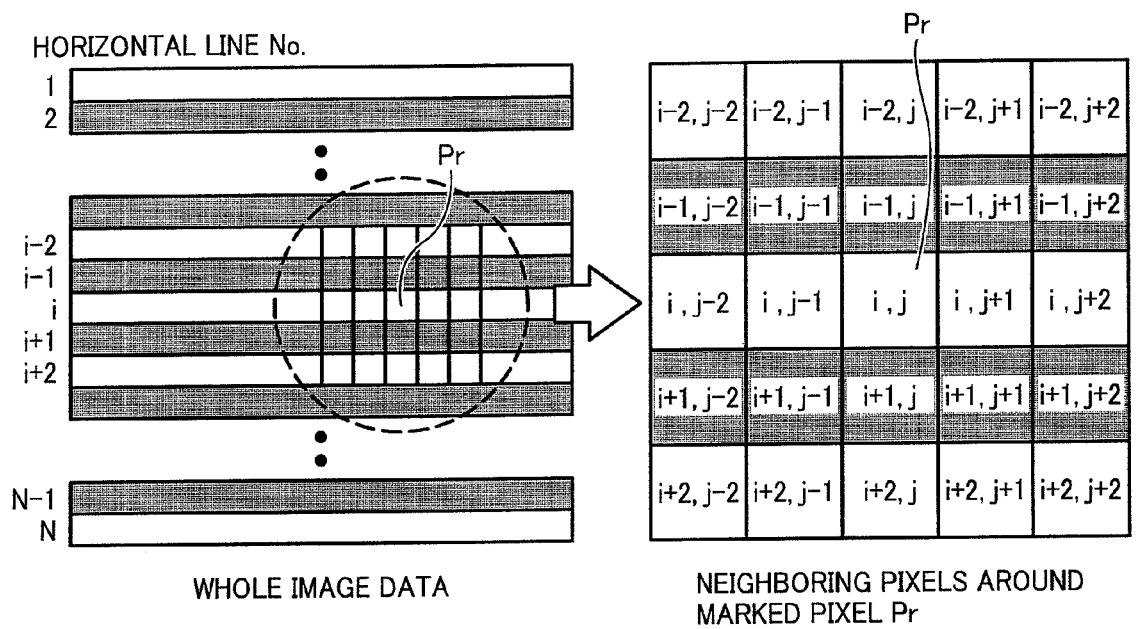

BEFORE DISTORTION CORRECTION
(BARREL-SHAPED DISTORTION)

AFTER DISTORTION CORRECTION

MOVING IMAGE PROCESSING APPARATUS AND VIDEO CAMERA APPARATUS USING THE SAME

CROSS REFERENCE TO RELATED APPLICATIONS

The present application is based on and claims priority from Japanese Application Numbers 2008-266157, filed on Oct. 15, 2008, and 2009-132049, filed on Jun. 1, 2009, the disclosure of which is hereby incorporated by reference herein in its entirety.

BACKGROUND OF THE INVENTION

1. Field of the Invention

The present invention relates to a moving image processing apparatus configured to convert image data in a progressive system into image data in an interlace system and to output the interlaced-type image data, and a video camera apparatus using such a moving image processing apparatus.

2. Description of the Related Art

Conventionally, a video camera apparatus which outputs imaged image data in an interlaced system to display the imaged data as a moving image has been known. Such a video camera apparatus has been used in various fields for, for example, an in-vehicle camera, a camera for security, or the like as the downsizing of the apparatus has improved. For improving downsizing of the video camera apparatus, there is a problem in reducing the power consumption. This is because the calorific power increases as an amount of the power consumption increases in a video camera apparatus and in this case, a heat release mechanism is necessary for a normal operation. In addition, in a case where electric power is supplied. by a battery, if the power consumption is large, a large-size battery is required and the apparatus becomes large as a whole.

Accordingly, in order to reduce the power consumption as a whole in the video camera apparatus, firstly, image data in a progressive system (referred to as progressive-type image data) are converted into image data in an interlaced system (referred to as interlaced-type image data) and then image processing calculation is performed on the interlaced-type image data so that the calculation amount per hour in the image processing can be reduced (see, for example, Japanese Patent Application Publication No. 2008-054221). In the conventional video camera apparatus, if an image processing including an electronic enlargement processing is performed after the image data are converted into the interlaced-type image data, resolution of the image data is degraded. Accordingly, when an electronic zoom mode is set to be ON, the progressive-type image data are converted into the interlaced-type image data after the image processing is performed on the progressive-type image data.

The converted interlaced-type image data has a data amount which is about a half of the original progressive-type image data. Accordingly, if the image processing is performed after the image data are converted into the interlaced-type image data in the conventional video camera apparatus, it is possible that the appropriate image processing cannot be performed even in a case where the image processing does not include an electronic enlargement process.

On the other hand, in the conventional video camera apparatus, when the electronic zoom mode is set to be ON, the progressive-type image data are converted into the interlaced-type image data after the image processing is performed on the progressive-type image data so that the power consumption cannot be reduced.

SUMMARY OF THE INVENTION

An object of the present invention is to provide a moving image processing apparatus and a video camera apparatus using the same, which converts progressive-type image data obtained from an image data source into interlaced-type image data and in which appropriate image processing can be performed while the power consumption and calorific power can be reduced.

To achieve the above object, a moving image processing apparatus according to an embodiment of the present invention includes a low-speed clock generation source configured to generate a low-speed clock signal of a first frequency, a high-speed clock generation source configured to generate a high-speed clock signal of a second frequency which is higher than the first frequency, an image data source configured to output progressive-type image data, a PI converter configured to convert the progressive-type image data output from the image data source into interlaced-type image data forming a field and to output the interlaced-type image data, and an arithmetic part configured to process the interlaced-type image output from the PI converter by use of only one of a pair of fields each formed by the interlaced-type image output from the PI converter. The high-speed clock generation source supplies the high-speed clock signal to the image data source and the PI converter, and the low-speed clock generation source supplies the low-speed clock signal to the arithmetic part and the processed interlaced-type image data are output from the moving image processing apparatus at the first frequency.

BRIEF DESCRIPTION OF THE DRAWINGS

FIG. 3 is an explanatory view showing a filter processing.

FIG. 4A is an explanatory view showing a specific example of filter factors in a case where filter factors exist at both of odd and even lines.

FIG. 4B is an explanatory view showing a specific example of filter factors in a case where filter factors exist only at odd lines.

DETAILED DESCRIPTION OF THE PREFERRED EMBODIMENTS

Preferred embodiments of the present invention will be described in detail with reference to the accompanying drawings below.

Figure 1:
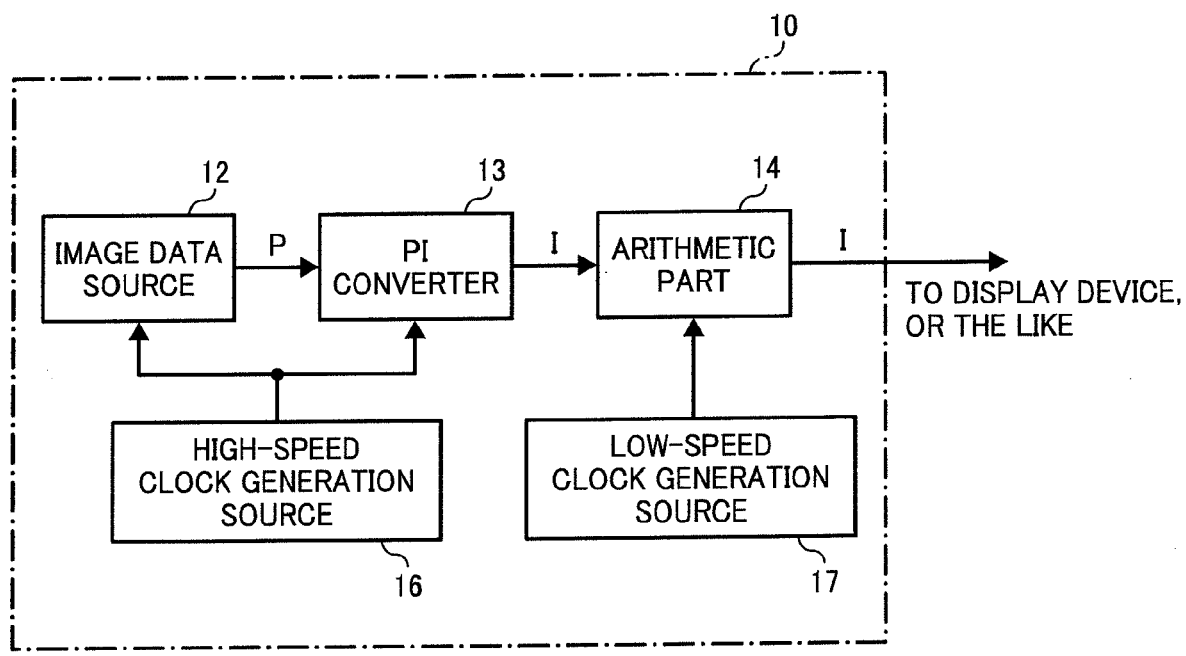
FIG. 1 is a block diagram showing a schematic configuration of a moving image processing apparatus according to an embodiment of the present invention.

At first, a moving image processing apparatus according to an embodiment of the present invention will be explained. FIG. 1 is a block diagram showing a schematic configuration of a moving image processing apparatus 10 of an embodiment of the present invention, In the following drawings, reference letter P indicates an output or transfer of data in a progressive system and reference letter I indicates an output or transfer of data in an interlaced system. The progressive system is a system where digital data are transferred one by one in order from a first horizontal line, that is, a first row (left end) to a last row (right end) of a first column (top column), to the following horizontal lines in sequence downwardly, so that the top left end pixel to the bottom right pixel of one frame of image data are transferred. The interlaced system is a system where digital data are transferred in order from a first horizontal line, that is, a first row (left end) to a last row (right end) of a first column (top column), to the following horizontal lines in sequence downwardly by skipping another line in one frame of image data. That is, digital data of odd horizontal lines are downwardly transferred in sequence, and then, even horizontal lines are downwardly transferred in sequence.

The moving image processing apparatus 10 includes an image data source 12, a PI converter 13, an arithmetic part 14, a high-speed clock generation source 16, and a low-speed clock generation source 17.

The image data source 12 is configured to output image data made of sets of pixel data which are digital data as electric signals. Examples of the image data source 12 include, for example, an image sensor, a video camera apparatus, a recording device in which image data are stored, a recording medium in which image data are stored, and the like. The image data are output in the progressive system to the PI converter 13 and therefore referred to as progressive-type image data.

Figure 2:
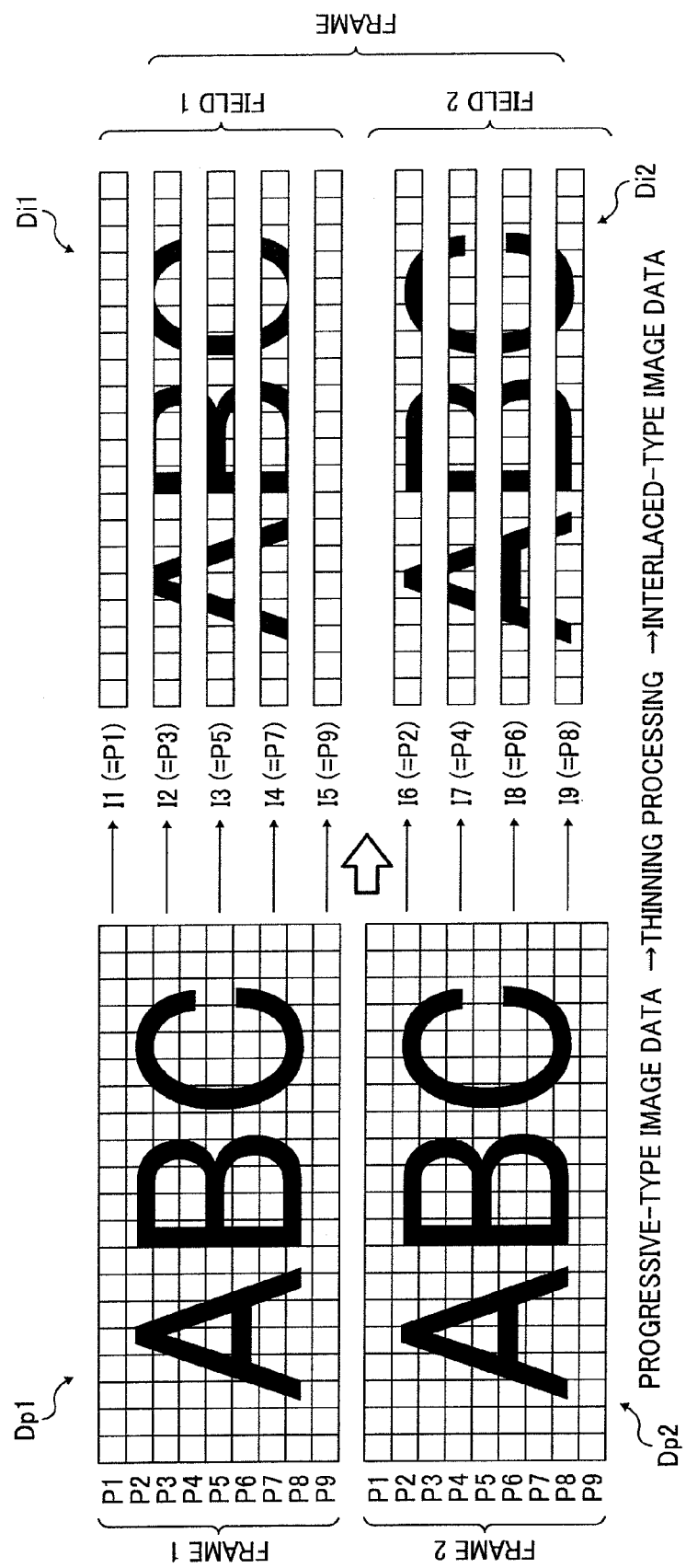
FIG. 2 is an explanatory view showing a concept of a PI conversion.

The PI converter 13 is configured to perform a so-called PI conversion where the progressive-type image data output from the image data source 12 are converted into interlaced-type image data. The PI conversion in the PI converter 13 will be explained with reference to FIG. 2. FIG. 2 is an explanatory view schematically showing a concept of the PI conversion. For simplicity, in FIG. 2, image data of one frame are composed of nine horizontal lines. At a left hand side of FIG. 2, two sets of the progressive-type image data are arranged one above the other. Dp1 indicates the upper set of the progressive-type image data and Dp2 indicates the lower set of the progressive-type image data. The horizontal lines in each of sets of the progressive-type image data Dp1 and Dp2 are indicated by column numbers P1 to P9 in order from the top to the bottom. At a right hand side of FIG. 2, two sets of the interlaced-type image data are arranged one above the other. Di1 indicates the upper set of the interlaced-type image data and Di2 indicates the lower set of the interlaced-type image data. The horizontal lines through the two sets of the interlaced-type image data Di1 and Di2 are indicated column numbers I1 to I9 in order from the top of the upper interlaced-type image data to the bottom of the lower interlaced-type image data.

As described above, in both of the progressive and interlaced systems, pixel data are transferred in order of the first row to the last row in each horizontal line. On the other hand, in the progressive system, as described above, all horizontal lines are output from the first line in sequence while in the interlaced system, either odd horizontal lines or even horizontal lines are output from the first odd or even horizontal line in sequence. Accordingly, in order to convert the progressive-type image data into the interlaced-type image, a thinning processing is performed in which one line every two horizontal lines of the progressive-type image data is scanned or read out, that is, one horizontal line is skipped after the previous horizontal line is read out. Since the converted interlaced-type image data (Di1, Di2) are obtained by scanning the progressive-type image data Dp1, Dp2 by skipping one for each scanned horizontal line, in order to obtain the horizontal lines for one frame, two sets of interlaced-type image data Di1, Di2 are required. In the example shown in FIG. 2, the horizontal lines of the image data Di1 are indicated by I1 to I5 and the horizontal lines of the image data Di2 are indicated by I6 to I9. Specifically, the PI conversion may be performed by performing thinning processing as specifically described below.

The first horizontal line P1 of the original progressive-type image data Dp1 is employed as the first horizontal line I1 of the interlaced-type image data. Di1 (P1 to I1).

The second horizontal line P2 of the original progressive-type image data Dp1 is removed.

Similarly, the third horizontal line P3 of the progressive-type image data Dp1 is employed as the second horizontal line I2 of the interlaced-type image data Di1 (P3 to I2).

Similarly, the fourth horizontal line P4 of the progressive-type image data Dp1 is removed.

By repeating such a processing up to the ninth horizontal line P9 of the progressive-type image data Dp1, the progressive-type image data Dp1 are converted into the interlaced-type image data Di1.

Next, the first horizontal line P1 of the original progressive-type image data Dp2 is removed.

The second horizontal line P2 of the original progressive-type image data Dp2 is employed as the sixth horizontal line I6 of the interlaced image data Di2 (P2 to I6).

Similarly, the third horizontal line P3 of the progressive-type image data Dp2 is removed.

Similarly, the fourth horizontal line P4 of the progressive-type image data Dp2 is employed as the seventh horizontal line I7 of the interlaced-type image data Di2 (P4 to I7).

By repeating such a processing up to the ninth horizontal line P9 of the progressive-type image data Dp2, the progressive-type image data Dp2 is converted into the interlaced-type image data Di2.

Here, a set of image data composed of whole horizontal lines is referred to as a frame and a set of image data composed of horizontal lines after the thinning processing is performed, that is, about a half of the whole horizontal lines is referred to as a field. As described above, when the PI conversion is performed, in order to complete one frame by the image data, the progressive-type image data for two frames are required. That is, the interlaced-type image data for two fields (Di1 and Di2) are generated by the progressive-type image data for two frames (Dp1 and Dp2) and the image data for one frame are generated by the interlaced-type image data for the two fields Di1 and Di2.

As described above, the interlaced-type image data after the PI conversion is performed are output to the arithmetic part 14. The arithmetic part 14 is configured to calculate for image processing such as a noise removing processing, distortion correction processing, or the like. The arithmetic part 14 is capable of performing the image processing calculation by use of only one of the pair of fields each of which is formed by the interlaced-type image data without problems.

An example of such an image processing calculation will be explained below. FIG. 3 is an explanatory view showing a filter processing as an example. FIGS. 4A and 4B are explanatory views each showing a specific example of filter factors. FIG. 4A shows an example where the filter factors exist at both of odd lines and even lines and FIG. 4B shows an example where the filter factors exist only at odd lines.

The filter processing as an image processing is a processing in which a pixel Pr on the image data is marked and then an arithmetic factor is calculated based on neighboring pixels around the marked pixel to process the image data D of the marked pixel into image data D' for whole pixels on the image data as the marked pixel Pr. In this case, the neighboring pixels around the marked pixel Pr are sufficiently small in relation to the whole image data, and, in the example shown in FIG. 3, correspond to pixels of 5×5 in area where the marked pixel Pr is positioned at the center. The arithmetic factor calculated based on the neighboring pixels is obtained by integrated multiplication of the image data of each neighboring pixel by a filter factor which is a parameter as a matrix adapted to the set area.

Therefore, in the example of FIG. 3, five-by-five pixels where the marked pixel is positioned at the center from the whole image data, that is, 25 pixels in total are extracted to perform the filter processing. Here, in FIG. 3, a coordinate of the marked pixel Pr of the image data D is (i, j), and then in order of scanning image data, a coordinate of the top left end pixel of the set area is (i−2, j−2) and a coordinate of the bottom right end pixel is (i+2, j+2), where i, j are positive integers. In addition, in the filter processing, a central coordinate of the filter factor k corresponding to the marked pixel Pr is (i,j), a coordinate of the top left end pixel is (i−2, j−2), and a coordinate of the bottom right end pixel is (i+2, j+2).

The data D' which is obtained by performing the filter processing of the image data D of the marked pixel Pr with the filter factor k is expressed by the following equation (1).

$$D'(i,j) = k(i-2,j-2) \times D(i-2,j-2) + k(i-2,j-1) \times D(i-2,j-1) + \ldots + k(i+2,j+1) \times D(i+2,j+1) - k(i+2,j+2) \times D(i+2,j+2) \quad (1)$$

Here, coordinates of the 5×5 area in which the coordinate (i, j) is positioned at the center can be indicated as (i+a, j+b) (a, b=−2, −1, 0, 1, 2), and the data D' is expressed by the following equation (2).

$$D'(i,j) = \Sigma k(i+a,j+b) \times D(i+a,j+b) \ (a, b=-2, -1, 0, 1, 2) \quad (2)$$

Since the filter factor k is a parameter to process the image data D of the marked pixel Pr into the image data D', the pixel (or the image data) where the filter factor k is zero means a pixel (or image data) which is not necessary to perform the filter processing. In other words, in the filter processing of the image data D of the marked pixel Pr into the image data D', only the pixels in each of which the filter factor k is set to a numerical value which is not zero are necessary.

In the case of the filter factors shown in FIG. 4A, the filter factors of pixels of all of the five horizontal lines are not zero while, in the case of the filter factors shown in FIG. 4B, the filter factors of pixels at the second and fourth horizontal lines (shown by dots) are all zero. Therefore, in the case of the filter factors shown in FIG. 4B, the filter processing as the image processing calculation can be performed by use of only one of the pair of fields each formed by the interlaced-type image data without problems.

As described above, the image data processed by the arithmetic part 14 are transferred to a displaying device or a recording device (not shown) adapted to input signals in the interlaced system. The image data processed by the arithmetic part 14 may be transferred to a displaying device or a recording device adapted to analog input signals in the interlaced system after being converted into analog signals by a video DAC (not shown).

The moving image processing apparatus 10 further includes a high-speed clock generation source 16 and a low-speed clock generation source 17 to determine timings of operating each part of the above-described digital circuits, that is, the image data source 12, the PI converter 13, and the arithmetic part 14. The high-speed clock generation source 16 and the low-speed clock generation source 17 supply clock signals to each part, and may include a crystal oscillator, a PLL circuit, or the like.

In order to complete one frame with the interlaced-type image data, the progressive-type image data for two frames are required. Therefore, if, for example, it is required to update one frame with the interlaced-type image data per second (=1 fps), the original progressive-type image data should be operated at a speed where at least two frames are updated per second (=2 fps). Then, in the moving image processing apparatus 10, for parts in which the progressive-type image data are operated, it is necessary to supply a clock signal of a frequency which is at least two times in relation to the other parts in which the interlaced-type image data are operated.

Therefore, in the moving image processing apparatus 10, the high-speed clock generation source 16 is configured to supply a clock signal of a frequency at least two times in relation to the low-speed clock generation source 17. In an embodiment of the present invention, the high-speed clock generation source 16 is configured to supply a clock signal (high-speed clock signal) of a high frequency to the image data source 12 and the PI converter 13. The low-speed clock generation source 17 is configured to supply a clock signal (low-speed clock signal) of a low frequency to the arithmetic part 14.

Figure 5:
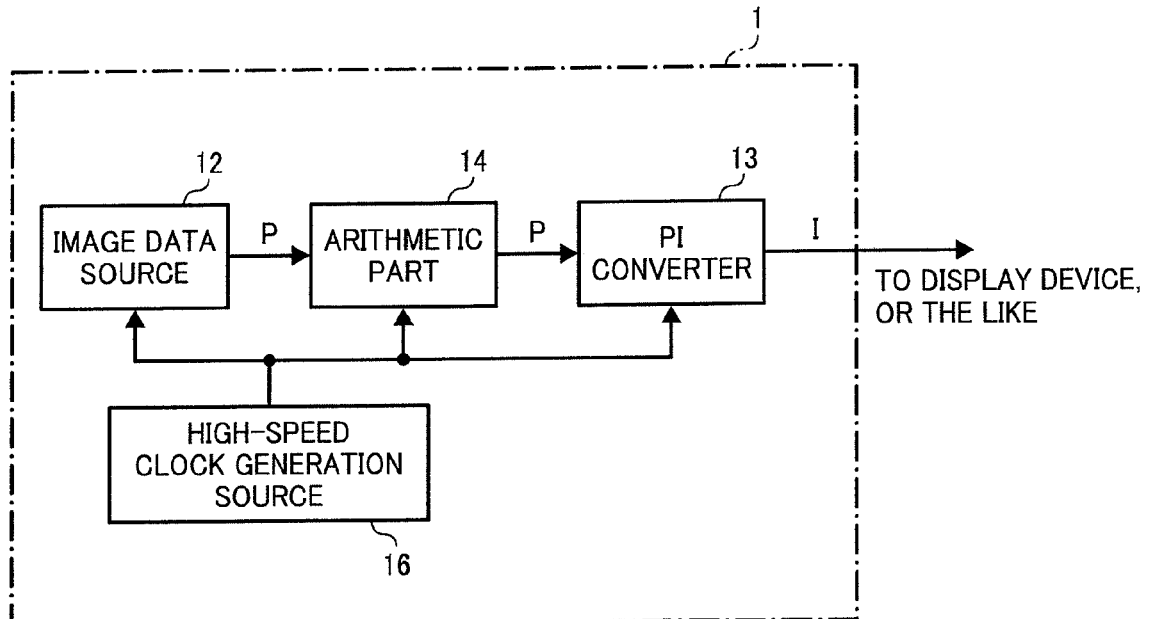
FIG. 5 is an explanatory view showing a configuration of a conventional moving image processing apparatus.

Next, problems in the conventional moving image processing apparatus 1 will be explained below. FIG. 5 is an explanatory view showing the configuration of the conventional moving image processing apparatus 1. Since the moving image processing apparatus 1 has basically the same configuration, the same reference numbers are used for the same configurations and the detailed explanation will be omitted.

The moving image processing apparatus 1 includes the arithmetic part 14 provided after the image data source 12 and then the PI converter 13 in order of the data flow.

Thereby, in the moving image processing apparatus 1, the parts in which the progressive-type image data are operated include the image data source 12, the arithmetic part 14, and the PI converter 13 and receive the high-speed clock signals of the high frequency supplied from the high-speed clock generation source 16. That is, in the moving image processing apparatus 1, there is no part in which the interlaced-type image data are operated and therefore the low-speed clock generation source 17 is not provided. Accordingly, in the moving image processing apparatus 1, all digital circuits, that is, all of the image data source 12, the arithmetic part 14, and the PI converter 13 arc operated by the high-speed clock signals so that the average frequency of the clock signals within the whole apparatus increases. In the digital circuit, since the operating amount per hour increases or decreases in proportion to increased or decreased frequency of the clock signal, power consumption increases or decreases in relation to the frequency of the clock signal. Accordingly, the power consumption in the moving image processing apparatus 1 increases and therefore the configuration of the moving image processing apparatus 1 is not preferable from the viewpoint of downsizing.

On the other hand, the moving image processing apparatus 10 according to an embodiment of the present invention, as shown in FIG. 1, has a configuration in which the progressive-type image data output from the image data source 12 are converted into the interlaced-type image data as the PI conversion, and then the converted image data are processed in the arithmetic part 14. Accordingly, it is possible to supply the low-speed clock signal of a lower frequency to the arithmetic part 14 which is positioned further after the PI converter 13 than the other digital circuits, that is, the image data source 12 and the PI converter 13, so that the average frequency of the clock signals within whole apparatus can be decreased in relation to the conventional moving image processing apparatus 1. Consequently, the operating amount per hour can be decreased so that the power consumption can be decreased in the moving image processing apparatus 10 of an embodiment of the present invention.

Furthermore, the moving image processing apparatus 10 is configured to perform image processing calculation, such as a filter processing as described in this example, in the arithmetic part 14 by referring to horizontal lines within only one of the pair of fields each formed by the interlaced-type image data, so that the image processing can be performed without problems.

Figure 6:
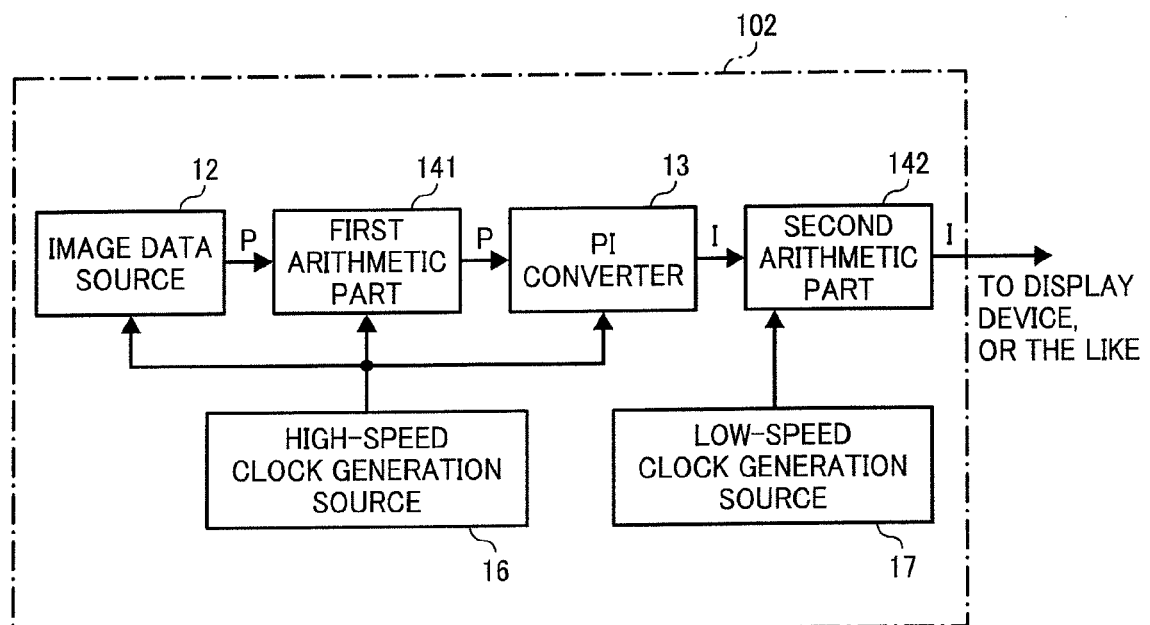
FIG. 6 is a block diagram showing another schematic configuration of a moving image processing apparatus according to an embodiment of the present invention.

Next, another concept of the moving image processing apparatus of an embodiment of the present invention will be explained. FIG. 6 is a block diagram showing a schematic configuration of the moving image processing apparatus 102. Since the moving image processing apparatus 102 has basically the same configuration as the moving image processing apparatus 10, the same reference numbers are used for the same configurations and the detailed explanation will be omitted.

The moving image processing apparatus 102 includes the image data source 12, a first arithmetic part 141, the PI converter 13, a second arithmetic part 142, the high-speed clock generation source 16, and the low-speed clock generation source 17.

The first and second arithmetic parts 141, 142 are each configured to perform image processing calculation. That is, the moving image processing apparatus 102 differs from the moving image processing 10, which has a single arithmetic part 14, in a point where two arithmetic parts are provided. The moving image processing apparatus 102 includes the first arithmetic part 141 after the image data source 12, the PI converter 13, and then the second arithmetic part 142 in order of the data flow.

The first arithmetic part 141 is configured to perform image processing calculation on the progressive-type image data output from the image data source 12. In other words, the first arithmetic part 141 performs the image processing calculation in which it is not appropriate to perform the image processing by referring to horizontal lines of only one of the pair of fields each formed by the interlaced-type image data. Such an image processing calculation includes, for example, the above-described filter processing in a case where pixels within all five horizontal lines have the filter factors which are not zero as shown in FIG. 4A.

The second arithmetic part 142 is configured to perform image processing calculation on the interlaced-type image data after the PI conversion is performed by the PI converter 13. Therefore, the second arithmetic part 142, similarly to the arithmetic part 14 of the moving image processing apparatus 10 shown in FIG. 1, can perform the image processing calculation by use of only one of the pair of fields each formed by the interlaced-type image data.

Accordingly, the moving image processing apparatus 102 has a configuration in which the high-speed clock generation source 16 supplies the high-speed clock signals of the high frequency to the image data source 12, the PI converter 13 and the first arithmetic part 141 and the low-speed clock generation source 17 supplies the low-speed clock signals of the low frequency to the second arithmetic part 142.

As described above, in the moving image processing apparatus 102, the first arithmetic part 141 performs the image processing calculation in which all the horizontal lines are required on the progressive-type image data output form the image data source 12, the progressive-type image data are converted into the interlaced-type image data by the PI converter 13, and then the interlaced-type image data are processed by the second arithmetic part 142. Accordingly, the appropriate image processing calculation can be performed while the average frequency of the clock signals used within the whole apparatus can be decreased so that the power consumption or calorific power can be reduced. In other words, in the moving image processing apparatus 102, the first arithmetic part 141 performs only the image processing calculation in which it is not appropriate to perform the image processing by use of only one of the pair of fields each formed by the interlaced-type image data and the second arithmetic part 142 performs the other image processing calculation in which it is appropriate to perform the image processing by use of only one of the pair of fields each formed by the interlaced-type image data. Accordingly, the appropriate image processing calculation can be performed while the power consumption and calorific power can be effectively reduced.

Here, instead of performing the image processing calculations separately by the first and second arithmetic parts 141 and 142, the desired image processing can be performed by providing a buffer memory, which stores the progressive-type image data before the PI conversion, in the moving image processing apparatus 102. However, such a configuration causes an increased cost with the additional buffer memory, and the like. On the other hand, in the moving image processing apparatus 102 according to an embodiment of the present invention, the image processing which needs all horizontal lines is performed by the first arithmetic part 141 and the image processing which can be performed by use of only one of the pair of fields each formed by the interlaced-type image data is performed by the second arithmetic part 142 so that increased cost can be suppressed.

Accordingly, in the moving image processing apparatus 102, the power consumption and calorific power can be reduced without increased cost while the appropriate image processing can be performed.

EXAMPLE 1

Figure 7:
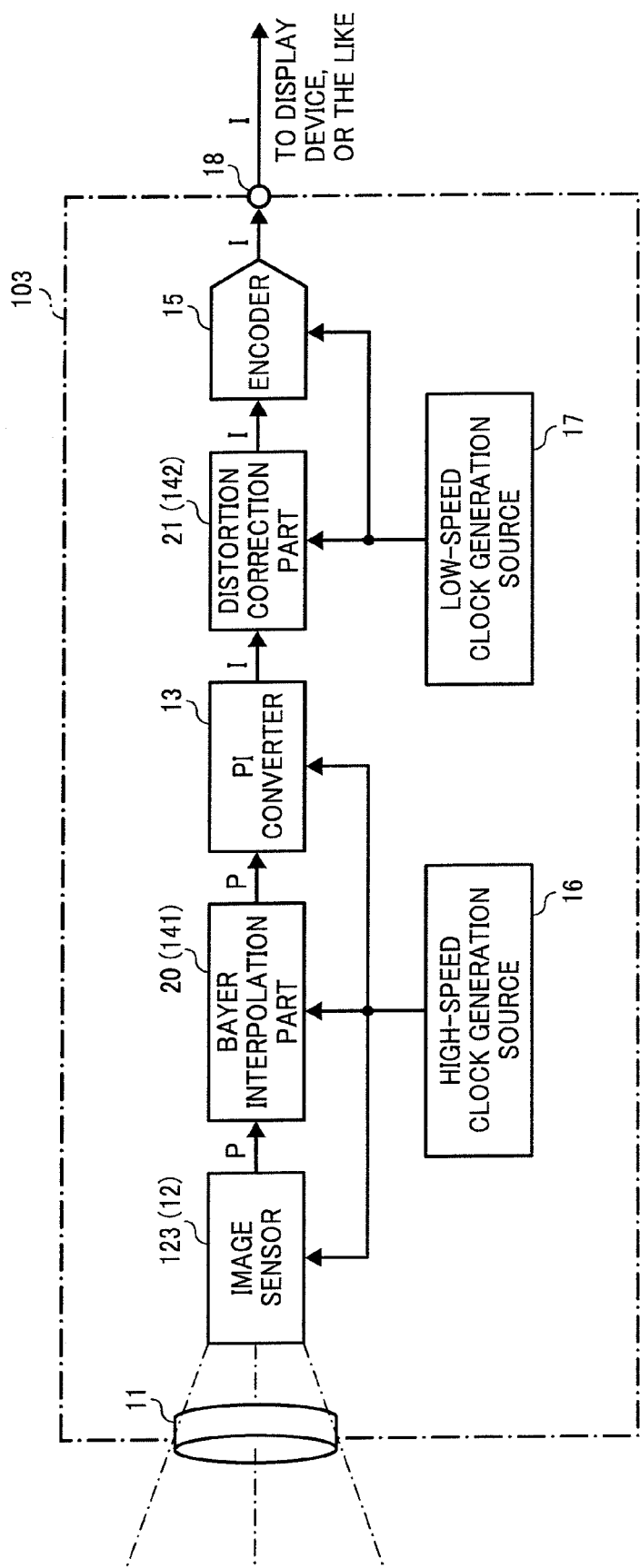
FIG. 7 is a block diagram showing a schematic configuration of a video camera apparatus according to an embodiment of the present invention.

Next, a specific example of a video camera apparatus having the above moving image processing apparatus according to an embodiment of the present invention will be explained. FIG. 7 is a block diagram showing a schematic configuration of the video camera apparatus 10. Since the video camera apparatus 103 has basically the same configurations as the above-described moving image processing apparatus 102, the same reference numbers are used for the same configurations and the detailed explanation will be omitted.

Here, in the video camera apparatus 103, the moving image processing apparatus according to an embodiment of the present invention is used to perform PI conversion where the progressive-type image data which are output from the aforementioned image sensor 123 as the image data source 12 into the interlaced-type image data which are in a commonly-used standard system, such as NTSC system, PAL system, or the like, to be adapted to a displaying device such as a television for displaying the input image data as a video image.

The video camera apparatus 103 includes an imaging optical system (not shown) having a lens 11, an image sensor 123, a Bayer interpolation part 20, the PI converter 13, a distortion correction part 21, an encoder 15, the high-speed clock generation source 16, the low-speed clock generation source 17, and an output end 18. That is, the video camera apparatus 103 includes the image sensor 123 as the image data source 12 in the moving image processing apparatus 102, the Bayer interpolation part 20 as the first arithmetic part 141 in the moving image processing apparatus 102, and the distortion correction part 21 as the second arithmetic part 142 in the moving image processing apparatus 102. The video camera apparatus 103 further includes the imaging optical system having the lens 11, the encoder 11, and the output end 18 in addition to the configurations in the moving image processing apparatus 102.

The imaging optical system is configured to image light from a subject to be imaged (not shown) onto a light-receiving surface of the image sensor 123 and appropriately composed of a plurality of lenses including the representative lens 11.

Figure 8:
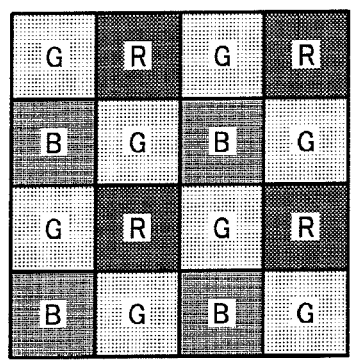
FIG. 8 is an explanatory view showing an example of a Bayer array.

The image sensor 123 having the light-receiving surface on which the light is imaged is configured to convert a subject image of the imaged light into electric signals (image data) and output the image data. The image sensor may be a CCD image sensor, a CMOS image sensor, or the like. The image sensor 123 has the light-receiving surface which is divided into lattice-shaped areas referred to as pixels and outputs the image data, which are made of a set of pixel data as digital data, as electric signals. Accordingly, the image sensor 123 can function as the image data source 12. The image sensor has color filters (RGB, CYM, or the like) arranged in a Bayer array on the divided areas (pixels), respectively (see FIG. 8). Thereby, the image sensor 123 outputs, as electric signals, the progressive-type image data composed of the set of pixel data of the digital data corresponding to the filter (RGB, CYM, or the like) arranged in the Bayer array to the Bayer interpolation part 20. In the Example 1, the image sensor 123 has RGB elementary color filters as shown in FIG. 8.

The Bayer interpolation part 20 is configured to perform image processing calculation for interpolating defective color in each pixel by use of the progressive image data as the digital data arranged in the Bayer array output from the image sensor 123 and output progressive-type image data (digital data) as full color RGB data.

Figure 9A:
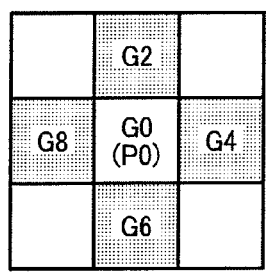
FIG. 9A is an explanatory view showing a Bayer interpolation of the Example 1 in a case where a defective color is G.
Figure 9B:
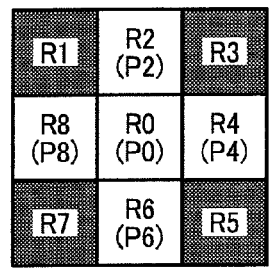
FIG. 9B is an explanatory view showing a Bayer interpolation of the Example 1 in a case where a defective color is R.

An example of such a Bayer interpolation calculation will be explained below. FIG. 8 is an explanatory view showing an example of the Bayer array. FIGS. 9A and 9B are explanatory views each illustrating a Bayer interpolation for this example. FIG. 9A shows a case in which the defective color is G and FIG. 9B shows a case in which the defective color is R. In the Example 1, a calculation method referred to as a linear interpolation or a bilinear interpolation is used as the Bayer interpolation calculation so that an average value is simply calculated.

As described above, since the image sensor 123 has the elementary color filters (RGB) arranged in the Bayer array so as to correspond to the divided areas (pixels), only the image data for one of the three colors RGB are obtained in each pixel (divided area). Accordingly, it is necessary to perform the Bayer interpolation for the image data output from the image sensor 123 with the image data of the defective other two colors in each pixel to obtain the full color image data (RGB data). In the Bayer array of the Example 1, as shown in FIG. 8, the colors R and B are arranged in the same way, and therefore the Bayer interpolation is performed in the same way for each of the colors R and B. Accordingly, only the color R will be explained and the explanation for the color B will be omitted.

At first, the color G filters are arranged in a positional relationship shown in FIG. 9A at any position within the Bayer array of FIG. 8. In FIG. 9A, the pixels or the areas in which the color G filters are provided are indicated by dots and the color R or B filters are provided at the other pixels or the other areas. Therefore, the color G filters are provided on four pixels on the left, right, top and bottom of an optional pixel P0 in which the color G filter is not provided. When the output values (pixel data) from the four pixels of the image sensor 123 are referred to as G2, G4, G6 and G8, respectively, the pixel data G0 of the color G at the pixel P0 can be obtained by the following equation (3).

$$G0=(G2+G4+G6+G8)/4 \quad (3)$$

Next, the color R filters are arranged in a positional relationship shown in FIG. 9B at any position within the Bayer array of FIG. 8. In FIG. 9B, the pixels or the areas in which the color R filters are provided are shown by dots and the color G or B filters are provided on the other pixels or the other areas. Therefore, when an optional pixel which is positioned at a center of the four pixels in which the color R filters are provided, the color R filters are also not provided on four pixels P8, P4, P2, P6 positioned on the left, right, top and bottom of the pixel P0. When the output values (pixel data) from the four pixels or areas in which the color R filters are provided around the pixel P0 of the image sensor 123 are referred to as R1, R3, R5, and R7, the pixel data R0, R2, R4, R6, and R8 of the respective pixels P0, P2, P4, P6 and P8 can be obtained by the following equations (4) to (8).

$$R0=(R1+R3+R5+R7)/4 \quad (4)$$

$$R2=(R1+R3)/2 \quad (5)$$

$$R4=(R3-R5)/2 \quad (6)$$

$$R6=(R5+R7)/2 \quad (7)$$

$$R8=(R1+R7)/2 \quad (8)$$

The Bayer interpolation part 20 converts the progressive-type image data as the digital data corresponding to the pixels arranged in the Bayer array output from the image sensor 123 into the image data as the full color RGB data by performing the above-described Bayer interpolation calculation and outputs the full color progressive-type image data. In addition, the interpolation equation as the Bayer interpolation calculation may be an equation for interpolating the image data with the pixel data of the defective color by use of the existing pixel data in order to obtain the full color RGB data, and therefore it is not limited to the above-described equations.

Here, since the image sensor 123 has the elementary color filters (RGB) arranged in the Bayer array, the color R (or B) filters are provided at only every other horizontal line (see FIG. 8), that is the other horizontal lines are skipped to provide the color R (or B) filters. Accordingly, the pixel data of the color R (or B), that is, the color R (or B) data, exist at only every other horizontal line within the output image data. If the thinning process is performed on the progressive-type image data output from the image sensor 123 by the PI conversion and horizontal lines are removed, the color R data are completely removed in the one field. and the color B data are completely removed in the other one field. Accordingly, the Bayer interpolation part 20 is positioned before the PI converter 12 because the Bayer interpolation calculation is not appropriately performed by use of only one of the pair of fields each formed by the interlaced-type image data, that is, all horizontal lines are required in the Bayer interpolation calculation.

As described above, the Bayer interpolation is performed by the Bayer interpolation part 20, and then the progressive-type image data as the full color RGB data are output to the PI converter 13 to perform the PI conversion. The full color RGB interlaced-type image data after the PI conversion are output to the distortion correction part 21.

The distortion correction part 21 is configured to perform the distortion correction calculation for the distortion correction by use of the full color interlaced-type image data output from the PI converter 13. Accordingly, the interlaced-type image data in which optical distortion occurring in the imaging optical system (not shown) having the lens 11 is removed are output.

Figure 10:
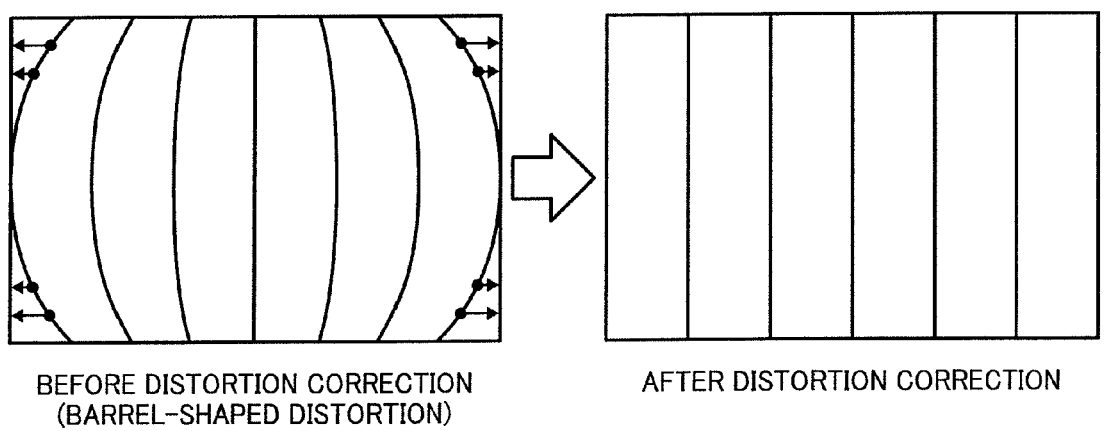
FIG. 10 is a schematic explanatory view showing a barrel-shaped distortion and a distortion correction of the barrel-shaped distortion, in which a state where the barrel-shaped distortion occurs is shown at the left hand side and a state where the barrel-shaped distortion is corrected is shown at the right hand side.
Figure 11:
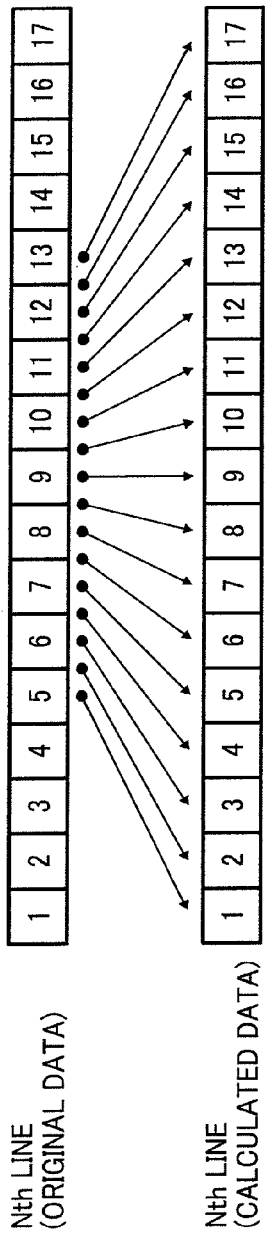
FIG. 11 is an explanatory view showing a concept of the distortion correction of the barrel-shaped distortion.

An example of such a distortion correction calculation will be explained. FIG. 10 is an explanatory view schematically showing a barrel-shaped distortion and the correction. The left hand side of FIG. 10 shows a state where the barrel-shaped distortion occurs, and the right hand side of FIG. 10 shows a state where the barrel-shaped distortion is corrected. FIG. 11 is an explanatory view showing a concept of the distortion correction calculation for correcting the barrel-shaped distortion.

In the video camera apparatus 103, the barrel-shaped distortion occurs as shown at the right hand side of FIG. 10, in the image data output from the image sensor 123. The barrel-shaped distortion is due to the optical property in the imaging optical system (not shown) having the lens 11 and the image data are fully rounded due to the distortion. The barrel-shaped distortion is most obvious as the lens has the widest angle. The amount of the distortion becomes larger as the distortion becomes closer to the peripheral of the image at a center, which is positioned at a position of the optical axis. A displayed image is in a horizontally-long rectangular shape and therefore the barrel-shaped distortion may be considered as the distortion in which the image is shrunk in a direction along the horizontal line in the image having the distortion. Thereby, in order to correct the barrel-shaped distortion in the displayed image, it is necessary to enlarge the image data in the horizontal direction by varying an enlargement factor so as to increase the enlargement factor with increasing distance from the center (the position of the optical axis) of the image in a vertical direction. Here, the enlargement factor varies according to the coordinate of each pixel in the vertical direction within the image data.

The enlargement in the horizontal direction will be explained with reference to FIG. 11. For simplicity, one horizontal line is composed of 17 pixels (first to seventeenth rows) in FIG. 11. At the upper side of FIG. 11, pixel data of an Nth horizontal line before correcting the barrel-shaped distortion are shown and at the lower side of FIG. 11, pixel data of an Nth horizontal line after correcting the barrel-shaped distortion are shown.

In enlarging the image, less original pixel data are calculated to generate more pixel data than the original pixel data. In FIG. 11, shown is an example in which nine pixels of the fifth row to 13th row of the Nth horizontal line are calculated as the original pixels to generate new pixel data of 17 pixels.

The pixel data of the first row (left end) of the horizontal line after the correction are copies of the pixel data of the fifth row of the horizontal line before the correction.

The pixel data of the second row of the horizontal line after the correction are an average value of the pixel data of the fifth and sixth rows of the horizontal line before the correction.

The pixel data of the third row of the horizontal line after the correction are copies of the pixel data of the sixth row of the horizontal line before the correction.

(An Omission)

The pixel data of the 16th row of the horizontal line after the correction are an average value of the pixel data of the 12th and 13th rows of the horizontal line before the correction.

The pixel data of the 17th row (right end) of the horizontal line after the correction are copies of the pixel data of the 13th row of the horizontal line before the correction.

As described above, the Nth horizontal line are newly generated. Although in the Example 1, cases of "copies" and "average value" are alternatively used for performing the distortion correction calculation, it is not limited thereto and a distortion correction, which is performed so as to be adapted to the optical property of the imaging optical system having the lens 11 may be used. For example, a distortion correction in which the pixel data of the fifth row and the sixth row are appropriately weighted, for example, are combined at an appropriate ratio, for example, at a ratio of 7 to 3, or the like may be used.

As described above, since it is necessary to vary the enlargement factor according to the coordinate of each pixel in the image data in the vertical direction, it is obvious that the calculation is modified according to a number of lines to be adapted to the optical property of the imaging optical system having the lens 11, for example, at the (N−1)th horizontal line, the pixel data of the third row in the horizontal line before the correction may be copied to the pixel data of the first row in the horizontal line after the correction.

In the distortion correction calculation, in order to generate each pixel data of the Nth horizontal line after the correction, only each pixel data of the Nth horizontal line before the correction are referred to. Accordingly, since the distortion correction calculation can be performed by referring to only one of the two sets of interlaced-type image data which are necessary to form one frame, the distortion correction part 21 can be positioned after the PI converter 13.

The image data in which the optical distortion is removed by the distortion correction part 21 are output to the encoder 15. The encoder 15 is a so-called video DAC and converts interlaced-type image data of digital signals into interlaced-type image data of analog signals in an NTSC system, a PAL system, or the like.

The video camera apparatus 103 includes the output end 18 to output the image data from the encoder 15. The not-shown displaying device adapted to the NTSC system, the PAL system, or the like, for example, a television, can be electrically connected to the output end 18. The image data which are converted into the image data of the analog signals such as the NTSC system, the PAL system, or the like by the encoder 15 are output to the displaying device connected to the output end 18. Therefore, the video camera apparatus 103 is capable of displaying the imaged image as a moving image on the displaying device.

In the video camera apparatus 103, the high-speed clock generation source 16 supplies the high-speed clock signal of the high frequency to the image sensor 123, the Bayer interpolation part 20, and the PI converter 13 and the low-speed clock generation source 17 supplies the low-speed clock signal of the low frequency to the distortion correction part 21 and the encoder 15.

As described above, in the video camera apparatus 103 of the Example 1, the progressive-type image data output from the image sensor 123 are processed by the Bayer interpolation part 20 performing the Bayer interpolation calculation which needs all the horizontal lines. After that, the progressive-type image data are converted into the interlaced-type image data by the PI converter 13 with the PI conversion and then the distortion correction part 21 performs the distortion correction calculation which can be appropriately performed by referring to only one of the pair of fields each formed by the interlaced-type image data. Accordingly, appropriate image processing calculation can be performed while an average value of frequencies of clock signals in the whole of an apparatus can be decreased.

Furthermore, the video camera apparatus 103 of the Example 1 can reduce the power consumption and calorific power.

EXAMPLE 2

Figure 12:
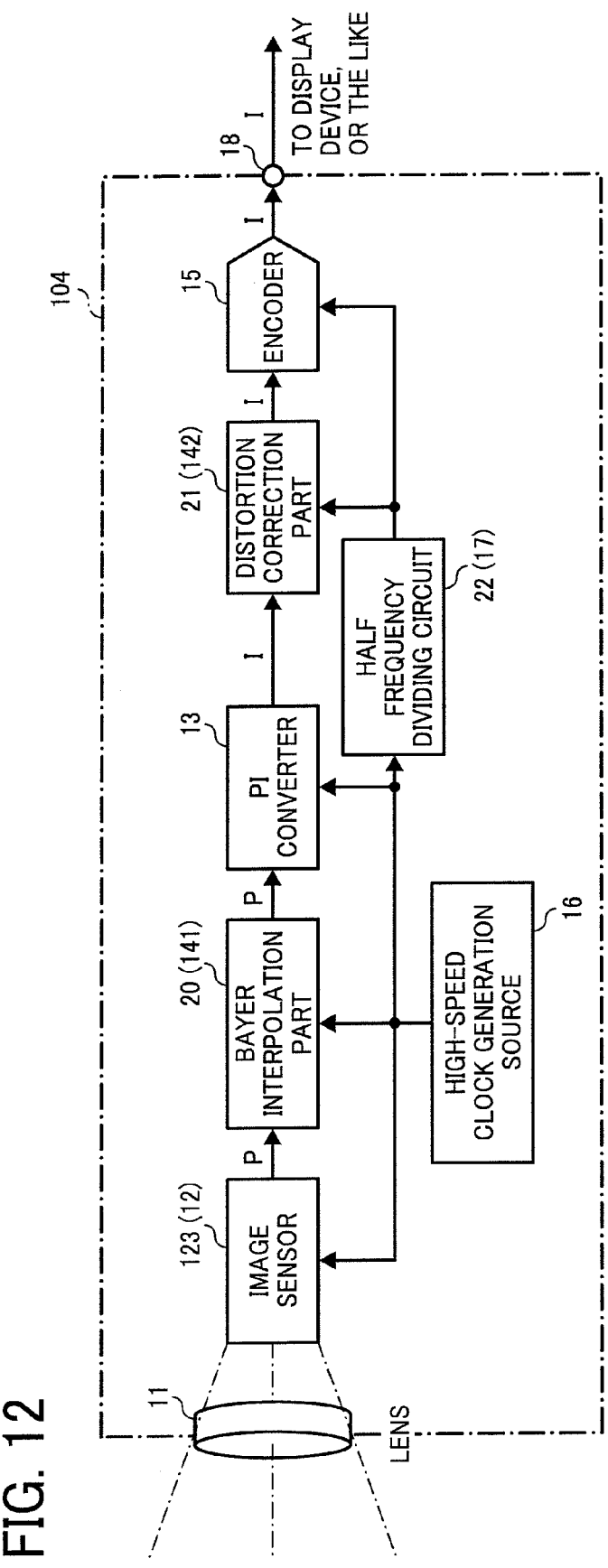
FIG. 12 is a block diagram showing a schematic configuration of a video camera apparatus according to another embodiment of the present invention.

Next, another specific example of the video camera apparatus of the present invention will be explained. FIG. 12 is a block diagram showing a schematic configuration of the video camera apparatus 104. Since the video camera apparatus 104 has basically the same configurations as the above-described video camera apparatus 103, the same reference numbers are used for the same configurations, and the detailed explanation will be omitted.

The video camera apparatus 104 includes a half frequency dividing circuit 22 instead of the low-speed clock generation source 17 used in the video camera apparatus 103.

In the video camera apparatus 104, the high-speed clock generation source 16 is connected to the half frequency dividing circuit 22 as well as the image sensor 123, the Bayer interpolation part 20, and the PI converter 13. The half frequency dividing circuit 22 is connected to the distortion correction part 21 and the encoder 15. The half frequency dividing circuit 22 is configured to divide the frequency of the clock signal input from the high-speed clock generation source 16 to output a half of the input frequency. Thereby the half frequency dividing circuit 22 functions as the low-speed clock generation source 17 which supplies a low-speed clock signal of a low frequency.

In the video camera apparatus 104, the high-speed clock signal of the high frequency which is supplied to the image sensor 128, the Bayer interpolation part 20, and the PI converter 13 is at a speed twice the low-speed clock signal of the low frequency which is supplied to the distortion correction part 21 and the encoder 15. Thereby, the image sensor 123, the Bayer interpolation part 20, and the PI converter 13 are operated at a speed twice of the distortion correction part 21 and the encoder 15.

Here, in the video camera apparatus 104, as described above, the PI conversion in the PI converter 13 is a processing in which the thinning processing which scans or reads out horizontal lines of the progressive-type image data by skipping every other horizontal lines is performed and the progressive-type image data are converted into the interlaced-type image data. Each part in which the progressive-type image data are operated should receive the high-speed clock signal of the high frequency which is at least twice the other part in which the interlaced-type image data are operated. However, if the high-speed clock signal of the frequency twice or more is supplied to each part in which the progressive-type image data are operated, there is time wasting, for example, for waiting for starting the operation of the part in which the progressive-type image processing until the operation of the other parts in which the interlaced-type image data are operated is completed. Accordingly, if the parts in which the progressive-type image data are operated receive the clock signal of the frequency just twice of the clock signal supplied to the parts in which the interlaced-type image data, whole parts in the apparatus can be smoothly operated without waste.

In the Example 2, the high-speed clock signal from the high-speed clock generation part 16 is divided to generate the low-speed clock signal of the half frequency of the original high-speed clock signal, but it is not limited thereto. For example, it may be possible that the frequency of the low-speed clock signal is ½ of the frequency of the high-speed clock signal, that is, for example, a PLL (Phase Locked Loop) circuit may be connected to the low-speed dock generation source and multiply twice the frequency of the clock signal of the low-speed clock signal to generate the clock signal of the high frequency.

Here, it may be determined whether the frequency of the low-speed clock signal is multiplied twice or the frequency of the high-speed clock signal is divided to be half, in consideration of availability of a crystal oscillator having an appropriate frequency to be used in either a high-speed or low-speed clock generation source, the cost for the whole apparatus, or the like.

In the video camera apparatus 104, as described above, the low-speed clock signal of the low frequency is generated by dividing in half the high frequency of the high-speed clock signal from the high-speed clock generation source 16 by the half frequency dividing circuit 22. The frequency of the high-speed clock signal output from the high-speed clock generation source 16 is set to 27 MHz or 36 MHz and the frequency of the low-speed clock signal output from the half frequency dividing circuit 22 is set to 13.5 MHz or 18 MHz because of the configuration, in the video camera apparatus 104, in which the encoder 15 converts the image data into the image data of analog data in the NTSC system, the PAL system, or the like adapted to a set standard ITU-R BT601. That is, these frequencies are set to be normalized according to a standard set to display a moving image based on the interlaced-type image data output from the apparatus.

In the standard ITU-R BT601, sampling frequencies when an AD conversion or a DA conversion is performed are set to 13.5 MHz or 18 MHz. Therefore, in the video camera apparatus 104, the frequency of the low-speed clock signal generated by the low-speed clock generation source (the half frequency dividing circuit 22 in the Example 2) is set to be adapted to display a moving image based on the interlaced-type image data output from the encoder 15, that is to display a moving image on the displaying device (not shown) connected via the output end 18.

As described above, in the video camera apparatus 104 of the Example 2, the relationship between the frequencies of the clock signals used for the parts in which the progressive-type image data are operated and the parts in which the interlaced-type image data are operated can be appropriately adapted to the operating amount of the image data. Accordingly, the video camera apparatus 104 can provide an effective configuration.

In the video camera apparatus 104 of the Example 2, the Bayer interpolation part 20 performs the Bayer interpolation calculation in which all horizontal lines of the progressive-type image data output from the image sensor 123 are required, the PI converter 13 performs the PI conversion to convert the progressive-type image data into the interlaced-type image data, and then the distortion correction part 21 performs the distortion correction calculation which can be appropriately performed by referring to only one of the pair of fields each formed by the interlaced-type image data. Accordingly, the appropriate image processing can be performed while an average value of the frequencies of the clock signals can be reduced in the whole apparatus.

Thereby, in the video camera apparatus 104, the low power consumption and low calorific power can be achieved.

In the video camera apparatus of the present invention, the progressive-type image data are obtained and then the interlaced-type image data are output and appropriate image processing can be performed while the power consumption and calorific power can be reduced.

Although the present invention has been described in terms of exemplary embodiments, it is not limited thereto. It should be appreciated that variations may be made in the embodiments described by persons skilled in the art without departing from the scope of the present invention as defined by the following claims.

In addition, in the above-described embodiments or Examples, although as an example of the video camera apparatus using the moving image processing apparatus of the present invention, the video camera apparatus 103 is shown, the moving image processing apparatus 10 shown in FIG. 1 may be used. In this case, for example, the image sensor is used as the image data source 12 in the moving image processing apparatus 10 and the video camera apparatus may further include an imaging optical system having the lens 11 to image light on the light-receiving surface of the image sensor, as well as the encoder 15 and the output end 18. Since the video camera apparatus has the arithmetic part 14 to perform the image processing calculation which can be appropriately performed by use of only one of the pair of fields each formed by the interlaced-type image data, the image processing calculation includes an image processing in which full color image data (RGB data) are not necessary, for example, in a night-vision camera using infrared light, an image processing in which full color image data can be appropriately obtained by use of only one of the pair of fields each formed by the interlaced-type image data by use of an alternative system other than the elementary color filters arranged in the Bayer array, and the like.

Furthermore, in the above-described embodiments or Examples, as an example of the video camera apparatus according to the present invention, shown is the configuration in which the Bayer interpolation part 20 is provided as the first arithmetic part 141 in the moving image processing apparatus 102, and the distortion correction part 21 as the second arithmetic part 142 in the moving image processing apparatus 102 is provided in the video camera apparatus 103 (104). However, it may be possible that the first arithmetic part 141 (20) performs an image processing calculation which is not appropriately performed by use of only one of the pair of fields each formed by the interlaced-type image data and the second arithmetic part 142 (21) performs an image processing calculation which is appropriately performed by use of only one of the pair of fields each formed by the interlaced-type image data, and it is not limited thereto.

According to a moving image processing apparatus of an embodiment of the present invention, since it is possible to operate an arithmetic part by a low-speed clock signal, the power consumption and the calorific power can be reduced in the whole apparatus as described below.

In general, an amount of the power consumption P of a digital circuit can be expressed by the following equation:

$$P = \alpha \times C \times (V^2) \times f$$

where α is an operating factor of a circuit, C is a load capacity, V is a source voltage, and f is an operating frequency.

Here, the load capacity C increases with an increase of the number of components forming the digital circuit such as a transistor, a CMOS, and the like and indicates a scale of the digital circuit. Multiplying the load capacity C by the operating factor α, that is, (α×C) indicates a scale of the actually operating circuit. Therefore, it can be found from the above equation that the amount of the power consumption of the digital circuit is proportional to the operating frequency in a case where the predetermined digital circuit is operated by a predetermined source voltage and that the amount of the power consumption can be reduced by decreasing the operating frequency.

Accordingly, it is effective to reduce the operating frequency for reducing the power consumption in an apparatus having the digital circuit, and the arithmetic part is operated by the low-speed clock signal so that the operating frequency can become lower and then the power consumption and the calorific power can be reduced within a whole apparatus.

Furthermore, the arithmetic part performs the image processing calculation by use of only one of the pair of fields respectively formed by two sets of the interlaced-type image data output from the PI converter so that the appropriate image processing can be performed.

A moving image processing apparatus according to an embodiment of the present invention includes a low-speed clock generation source configured to generate a low-speed clock signal of a first frequency, a high-speed clock generation source configured to generate a high-speed clock signal of a second frequency which is higher than the first frequency, an image data source configured to output progressive-type image data, a first arithmetic part configured to process the progressive-type image data output from the image data source by performing first image processing calculation by use of the progressive-type image data output from the image data source, a PI converter configured to convert the processed progressive-type image data output from the first arithmetic part into interlaced-type image data, and a second arithmetic part configured to process the interlaced-type image data by performing second image processing calculation by use of only one of the pair of fields each formed by the interlaced-type image data output from the PI converter. The high-speed clock generation source supplies the high-speed clock signal to the image data source, the first arithmetic part, and the PI converter, and the low-speed clock generation source supplies the low-speed clock signal to the second arithmetic part and processed interlaced-type image data are output from the moving image processing apparatus at the first frequency. Accordingly, since the second arithmetic part can be operated by the low-speed clock signal, the power consumption and the calorific power can be reduced in the whole apparatus.

Furthermore, since the image processing calculation which can be appropriately performed by referring to only one of the pair of fields formed by the two sets of the interlaced-type image data is performed by the second arithmetic part after the PI conversion and the other image processing calculations are performed by the first arithmetic part before the PI conversion, the appropriate image processing can be performed.

A video camera apparatus according to an embodiment of the present invention includes a low-speed clock generation source configured to generate a low-speed clock signal of a first frequency, a high-speed clock generation source configured to generate a high-speed clock signal of a second frequency which is higher than the first frequency, an image sensor configured to output photographed video image as progressive-type image data which are made of digital data in Bayer array, a Bayer interpolation part configured to process the progressive-type image data output from the image sensor by performing a Bayer interpolation calculation by use of the progressive-type image data output from the image sensor, a PI converter configured to convert the processed progressive-type image data output from the Bayer interpolation part into interlaced-type image data forming a field, and a distortion correction part configured to perform distortion correction calculation by use of only one of the pair of fields each formed by the interlaced-type image data output from the PI converter. The high-speed clock generation source supplies the high-speed clock signal to the image sensor, the Bayer interpolation part, and the PI converter, and the low-speed clock generation source supplies the low-speed clock signal to the distortion correction part. Accordingly, since it is possible to operate the distortion correction part by the low-speed clock signal, the power consumption and the calorific power can be reduced.

Furthermore, the distortion correction calculation which can be performed by use of only one of the pair of fields each formed by the interlaced-type image data is performed by the distortion correction part after the PI conversion, and the Bayer interpolation calculation is performed by the Bayer interpolation part before the PI conversion so that the appropriate Bayer interpolation and the distortion correction can be performed.

In addition to the above configurations, when the frequency of the low-speed clock signal generated by the low-speed clock generation source is ½ of the frequency of the high-speed clock signal generated by the high-speed clock generation source, the distortion correction part can be operated by the low-speed clock signal so that the power consumption and the calorific power can be reduced.

Furthermore, since the distortion correction calculation which can be performed by use of only one of the pair of fields each formed by the interlaced-type image data is performed by the distortion correction part after the PI conversion and the Bayer interpolation calculation is performed by the Bayer interpolation part before the PI conversion, the appropriate Bayer interpolation and the distortion correction can be performed.

Moreover, the clock signal of the appropriate frequency can be supplied to each of the image sensor, the Bayer interpolation part, the PI converter, and the distortion correction part so as to adapt the frequency to the amount of the image data operated in each part. Accordingly, the effective configuration can be provided.

In addition to the above configurations, when the low-speed clock generation source is configured to set the frequency of the low-speed clock signal to be normalized according to a standard set to display a moving image based on the interlaced-type image data output from the moving image processing apparatus, the output interlaced-type image data can be easily displayed.

What is claimed is:

1. A moving image processing apparatus, comprising:
a low-speed clock generation source configured to generate a low-speed clock signal of a first frequency;
a high-speed clock generation source configured to generate a high-speed clock signal of a second frequency which is higher than the first frequency;
an image data source configured to output progressive-type image data;
a PI converter configured to convert the progressive-type image data output from the image data source into interlaced-type image data forming a field and to output the interlaced-type image data; and
an arithmetic part configured to process the interlaced-type image output from the PI converter by use of only one of a pair of fields each formed by the interlaced-type image output from the PI converter,
wherein the high-speed clock generation source supplies the high-speed clock signal to the image data source and the PI converter; and
the low-speed clock generation source supplies the low-speed clock signal to the arithmetic part and the processed interlaced-type image data are output from the moving image processing apparatus at the first frequency.

2. The moving image processing apparatus according to claim 1, wherein the first frequency is ½ of the second frequency.

3. The moving image processing apparatus according to claim 1, wherein the first frequency of the generated low-speed clock signal is set to be normalized according to a standard set to display a moving image based on the processed interlaced-type image data output from the moving image processing apparatus.

4. A moving image processing apparatus, comprising:
a low-speed clock generation source configured to generate a low-speed clock signal of a first frequency;
a high-speed clock generation source configured to generate a high-speed clock signal of a second frequency which is higher than the first frequency;
an image data source configured to output progressive-type image data;
a first arithmetic part configured to process the progressive-type image data output from the image data source by use of the progressive-type image data output from the image data source;
a PI converter configured to convert the processed progressive-type image data output from the first arithmetic part into interlaced-type image data forming a field; and
a second arithmetic part configured to process the interlaced-type image by use of only one of the pair of fields each formed by the interlaced-type image data output from the PI converter,
wherein the high-speed clock generation source supplies the high-speed clock signal to the image data source, the first arithmetic part, and the PI converter; and
the low-speed clock generation source supplies the low-speed clock signal to the second arithmetic part and the processed interlaced-type image data are output from the moving image processing apparatus at the first frequency.

5. The moving image processing apparatus according to claim 4, wherein the first frequency is ½ of the second frequency.

6. The moving image processing apparatus according to claim 4, wherein the first frequency of the generated low-speed clock signal is set to be normalized according to a standard set to display a moving image based on the processed interlaced-type image data output from the moving image processing apparatus.

7. A video camera apparatus, comprising:
a low-speed clock generation source configured to generate a low-speed clock signal of a first frequency;
a high-speed clock generation source configured to generate a high-speed clock signal of a second frequency which is higher than the first frequency;
an image sensor configured to output photographed video image as progressive-type image data which are made of digital data in Bayer array;
a Bayer interpolation part configured to process the progressive-type image data output from the image sensor by performing a Bayer interpolation calculation by use of the progressive-type image data output from the image sensor;
a PI converter configured to convert the processed progressive-type image data output from the Bayer interpolation part into interlaced-type image data forming a field; and
a distortion correction part configured to process the interlaced-type image data by performing distortion correction calculation by use of only one of the pair of fields each formed by the interlaced-type image data output from the PI converter,
wherein the high-speed clock generation source supplies the high-speed clock signal to the image sensor, the Bayer interpolation part, and the PI converter; and
the low-speed clock generation source supplies the low-speed clock signal to the distortion correction part and the processed interlaced-type image data are output from the video camera apparatus at the first frequency.

8. The video camera apparatus according to claim 7, wherein the first frequency is ½ of the second frequency.

9. The video camera apparatus according to claim 7, wherein the first frequency of the generated low-speed clock signal is set to be normalized according to a standard set to display a video image based on the processed interlaced-type image data output from the video camera apparatus.

* * * * *